(12) United States Patent  
Smith et al.

(10) Patent No.: US 10,116,019 B2
(45) Date of Patent: Oct. 30, 2018

(54) ENERGY STORAGE ASSEMBLY, TEMPERATURE CONTROL DEVICE, AND MOTOR VEHICLE

(71) Applicant: AUDI AG, Ingolstadt (DE)

(72) Inventors: Joshua Smith, Scheidegg (DE); Michael Hinterberger, Ingolstadt (DE); Christian Allmann, Ingolstadt (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/312,458

(22) PCT Filed: Apr. 11, 2015

(86) PCT No.: PCT/EP2015/000765
§ 371 (c)(1),
(2) Date: Nov. 18, 2016

(87) PCT Pub. No.: WO2015/176787
PCT Pub. Date: Nov. 26, 2015

(65) Prior Publication Data
US 2017/0093000 A1    Mar. 30, 2017

(30) Foreign Application Priority Data
May 21, 2014 (DE) .................. 10 2014 007 449

(51) Int. Cl.
*F28F 1/32* (2006.01)
*F28F 7/00* (2006.01)
(Continued)

(52) U.S. Cl.
CPC ...... *H01M 10/6569* (2015.04); *H01M 2/1077* (2013.01); *H01M 10/613* (2015.04);
(Continued)

(58) Field of Classification Search
None
See application file for complete search history.

(56) References Cited

U.S. PATENT DOCUMENTS

2011/0117410 A1    5/2011  Yoon
2013/0216888 A1*   8/2013  Shimura ........... H01M 10/5002
                                                    429/120

(Continued)

FOREIGN PATENT DOCUMENTS

CN          1401511 A        3/2003
CN          202111201 U      1/2012
(Continued)

OTHER PUBLICATIONS

Heat Pump Pro website (2013).*
(Continued)

*Primary Examiner* — Yoshitoshi Takeuchi
(74) *Attorney, Agent, or Firm* — Henry M. Feiereisen, LLC

(57) ABSTRACT

An energy storage assembly includes a plurality of electrical energy stores. Arranged between at least two electrical energy stores is at least one thermally conductive spacer element which has at least one area to separate the at least two electrical energy stores. The at least one spacer element is thermally coupled to at least one heat pipe of a first heat pipe assembly and to at least one heat pipe of a second heat pipe assembly.

21 Claims, 2 Drawing Sheets

(51) Int. Cl.
| | | |
|---|---|---|
| *H01M 2/10* | (2006.01) | |
| *H01M 10/0525* | (2010.01) | |
| *H01M 10/44* | (2006.01) | |
| *H01M 10/50* | (2006.01) | |
| *H01M 10/60* | (2014.01) | |
| *H01M 10/61* | (2014.01) | |
| *H01M 10/613* | (2014.01) | |
| *H01M 10/615* | (2014.01) | |
| *H01M 10/625* | (2014.01) | |
| *H01M 10/643* | (2014.01) | |
| *H01M 10/647* | (2014.01) | |
| *H01M 10/6551* | (2014.01) | |
| *H01M 10/6552* | (2014.01) | |
| *H01M 10/6554* | (2014.01) | |
| *H01M 10/6555* | (2014.01) | |
| *H01M 10/6556* | (2014.01) | |
| *H01M 10/6557* | (2014.01) | |
| *H01M 10/6563* | (2014.01) | |
| *H01M 10/6571* | (2014.01) | |
| *H01M 10/6572* | (2014.01) | |
| *H01M 10/658* | (2014.01) | |
| *H01M 10/663* | (2014.01) | |
| *H01M 10/6569* | (2014.01) | |
| *H01M 10/653* | (2014.01) | |
| *H01M 10/667* | (2014.01) | |

(52) U.S. Cl.
CPC ....... *H01M 10/615* (2015.04); *H01M 10/625* (2015.04); *H01M 10/653* (2015.04); *H01M 10/6552* (2015.04); *H01M 10/6555* (2015.04); *H01M 10/667* (2015.04); *H01M 2220/20* (2013.01)

(56) References Cited

U.S. PATENT DOCUMENTS

| | | |
|---|---|---|
| 2013/0244066 A1 | 9/2013 | Kang et al. |
| 2015/0028669 A1 | 1/2015 | Schmidt et al. |
| 2015/0200430 A1 | 7/2015 | Allmann et al. |
| 2015/0228956 A1 | 8/2015 | Schüssler et al. |

FOREIGN PATENT DOCUMENTS

| | | |
|---|---|---|
| CN | 103053068 A | 4/2013 |
| DE | 10 2008 054 958 A1 | 7/2010 |
| DE | 102008054958 A1 | 7/2010 |
| EP | 2 405 528 A1 | 1/2012 |
| JP | 2005-78970 | 3/2005 |
| WO | WO 2010/030875 A1 | 3/2010 |
| WO | WO 2012/091469 A2 | 7/2012 |

OTHER PUBLICATIONS

International Search Report issued by the European Patent Office in International Application PCT/EP2015/000765.
Chinese Search Report dated May 18, 2018 with respect to counterpart Chinese patent application 2015800264483.
Translation of Chinese Search Report dated May 18, 2018 with respect to counterpart Chinese patent application 2015800264483.

* cited by examiner

ENERGY STORAGE ASSEMBLY, TEMPERATURE CONTROL DEVICE, AND MOTOR VEHICLE

CROSS-REFERENCES TO RELATED APPLICATIONS

This application is the U.S. National Stage of International Application No. PCT/EP2015/000765, filed Apr. 11, 2015, which designated the United States and has been published as International Publication No. WO 2015/176787 and which claims the priority of German Patent Application, Serial No. 10 2014 007 449.8, filed May 21, 2014, pursuant to 35 U.S.C. 119(a)-(d).

BACKGROUND OF THE INVENTION

The invention relates to an energy storage assembly, comprised of a plurality of electrical energy stores, with at least one thermally conductive spacer element being arranged or configured between at least two electrical energy stores and having at least one area to separate the at least two electrical energy stores, wherein the at least one spacer element is thermally coupled to at least one heat pipe of a first heat pipe assembly which has at least one heat pipe.

Corresponding energy storage assemblies are known and are used, for example in the field of automotive technology, to feed electric energy to electrical consumers. Such energy storage assemblies have a number of electrically interconnected electrical energy stores. These electric energy stores may, for example, involve lithium ion energy stores or lithium-ion cells. The spacer elements are typically arranged between the electrical energy stores to maintain a distance between them and via which an electrical insulation of the electrical energy stores from one another can be realized.

Such energy storage assemblies, i.e. in particular those electrical energy stores associated thereto, are to be maintained at moderate temperature in order to prevent e.g. overheating or undercooling. Both overheating and undercooling adversely affect operativeness of the electrical energy stores and therefore of the overall energy storage assembly. In particular when overheating is involved, there is the possibility that the electrical energy stores or the entire energy storage assembly becomes damaged.

Known technical approaches for controlling the temperature of corresponding electrical energy stores or corresponding energy storage assemblies involve, for example, heat pipes which are thermally coupled with thermally conductive spacer elements. These approaches for controlling the temperature of electric energy stores or corresponding energy storage assemblies have room for improvement especially in terms of efficiency of the temperature control.

SUMMARY OF THE INVENTION

The invention is based on the object to provide an improved energy storage assembly.

The object is achieved by an energy storage assembly of the aforementioned type, which according to the invention is characterized in that the at least one spacer element is additionally thermally coupled with at least one heat pipe of a second heat pipe assembly which includes at least one heat pipe.

In the construction of the energy storage assembly according to the invention, provision is generally made for a plurality of electrically interconnected electrical energy stores, referred to hereinafter as energy stores in short. The energy stores are connected in series or in parallel with each other. For this purpose, electrical connection elements, like e.g. conductor rails ("bus bars"), are typically provided.

Respective energy stores are hereby to be understood as cuboid or prismatic electrochemical structural units which typically are accommodated in energy storage housings and which include in particular at least two electrodes (anode, cathode), a separator arranged there between, and an electrolyte. The energy stores can therefore also referred to or considered as energy storage cells. In accordance with the chemistry of the electrochemical structural units, such an energy store may involve e.g. a lithium (ion) energy store. The electrodes on the side of the energy stores are typically electrically connected with electrical connectors which are arranged or configured on exposed outer wall portions of the energy storage housing. The afore-mentioned electrical connection of the energy stores is realized via these connectors.

Arranged or formed between at least two, typically between all, energy stores is at least one thermally conductive spacer element. The spacer elements are provided to maintain a distance between directly adjacent energy stores such that immediately adjacent energy stores are prevented from contacting each other electrically or mechanically. Accordingly, the spacer elements are therefore designed electrically insulating. In addition, the spacer elements provide heat conductions due to their thermal-conductive properties for the purpose of cooling by dissipating heat, especially from the energy stores in contact therewith, or for the purpose of heating to feed heat, especially to the energy stores in contact therewith.

A respective spacer element can thus involve, e.g., a plate-shaped, single or multi-layer component. It is also conceivable that a respective spacer element involves an at least partial coating of at least one energy store. In any case, a respective spacer element is formed from at least one electrically insulating material and/or surrounded by at least one electrically insulating material. The latter can, for example, be realized by a coating of at least an electrically insulating material, like, e.g., a plastic material or a ceramic, of a spacer element, which is formed from, e.g., a material that itself is not electrically insulating, i.e., e.g. of a metal, like, e.g., aluminum.

It is also conceivable that a respective spacer element is formed from at least one thermally conductive or configured thermally conducting plastic material, or from at least one thermally conductive ceramic material, or from a metal that is surrounded by at least one electrically insulating material. A respective plastic material may involve, e.g. a plastic material, e.g. polyolefin-based plastic material, provided with thermally conductive particles, like e.g. graphite particles. A thermally conductive ceramic material may involve, e.g. an oxide ceramic material, like, e.g., aluminum oxide. A respective metal may involve, e.g. aluminum or an aluminum alloy. Spacer elements formed of metallic materials or generally electrically conductive materials are, as mentioned, surrounded by at least one electrically insulating material. This is typically realized by electrically insulating coatings of the spacer elements, with in particular coatings from respective plastic or ceramic material being contemplated here.

The energy storage assembly according to the invention includes at least two separate heat pipe assemblies, each including at least one heat pipe. The principle according to the invention relates to maintaining the energy stores or the energy storage assembly at moderate temperature by means of so-called heat pipes of corresponding heat pipe assemblies, i.e. to heat or to cool. The temperature control of the energy stores or the energy storage assembly is realized by thermally coupling the thermally conductive spacer elements with corresponding heat pipes of first and second heat pipe assemblies. The thermally conductive spacer elements are, in turn, thermally coupled to the energy stores to be maintained at moderate temperature. The thermally conductive spacer elements thus form a thermal bridge between the heat pipes of the first and second heat pipe assemblies and the energy stores to be maintained at moderate temperature.

Typically, the plurality of electrical energy stores, in particular in parallel alignment, in addition to the respective spacer elements arranged or formed there between are arranged adjacent to one another to form an energy store stack, with at least one heat pipe of the first heat pipe assembly and at least one heat pipe of the second heat pipe assembly extending at least in part along at least one outer surface of the energy store stack. As mentioned above, a thermal coupling is hereby realized between respective heat pipes of the first and second heat pipe assemblies and corresponding spacer elements.

Heat pipes, which are also referred to as heat transfer tubes, involve efficient devices for transferring heat, i.e. heat exchangers. Heat pipes essentially include at least one evaporation zone, in which a or the working medium within the heat pipe in liquid or condensed or liquefied state, can be evaporated or is evaporated, and at least one condensation zone, in which a or the working medium within the heat pipe in gaseous or evaporated state can be condensed or is condensed. The working medium may involve, e.g., water, organic fluids like e.g. glycol, or respective mixtures of water and organic fluids like e.g. glycol.

During evaporation of the working medium in the evaporation zone, heat (evaporation heat) is removed from a heat source which is thermally coupled to the heat pipe and thus cooled. Conversely, during condensation of the working medium in the condensation zone, heat (condensation heat) is supplied to a heat sink which is thermally coupled to the heat pipe and thus heated. The functional and operating principle of respective heat pipes is generally known, so that no further explanation is needed in this respect at this point.

The geometry of respective heat pipes is generally (substantially) tubular or (substantially) cylindrical. The heat pipes can thus have (substantially) a round, roundish, or oval cross section. Also known are heat pipes with (substantially) planar geometries. The heat pipes can thus have a (substantially) rectangular cross section.

With respect to the energy storage assembly according to the invention, the energy stores can be heated or cooled via the heat pipes of the first and second heat pipe assemblies depending on the arrangement of the heat pipes of the first and second heat pipe assemblies in relation to the spacer elements. In this way, a particularly efficient and little space requiring principle for temperature control of respective energy stores or the energy storage assembly is realized.

It is hereby, e.g., possible to arrange at least one heat pipe of the first heat pipe assembly such as to enable a cooling of the energy stores or the energy storage assembly via this heat pipe. In this case, it is suitable, when at least one heat pipe of the first heat pipe assembly is thermally coupled with an evaporation zone, in which a liquid working medium within the heat pipe can be evaporated, to at least one spacer element.

Correspondingly, at least one heat pipe of the second heat pipe assembly can be arranged such as to enable a heating of the energy stores or the energy storage assembly. In this case, it is suitable, when at least one heat pipe of the second heat pipe assembly is thermally coupled with a condensation zone, in which a gaseous working medium within the heat pipe can be condensed, to at least one spacer element.

The thermal coupling between respective heat pipes of the first heat pipe assembly and the spacer element(s) or between respective heat pipes of the second heat pipe assembly and the spacer element(s) may be directly or indirectly. In general, it applies that at least one heat pipe of the first heat pipe assembly and/or at least one heat pipe of the second heat pipe assembly is directly thermally coupled with the at least one spacer element, or at least one heat pipe of the first heat pipe assembly and/or at least one heat pipe of the second heat pipe assembly is indirectly thermally coupled with a spacer element with interposition of at least one thermally conductive thermal coupling element. A corresponding thermal coupling member may involve, e.g., a heat conduction plate.

To increase the efficiency of the temperature control of the energy stores, including the temperature control of the energy storage assembly as a whole, it is suitable, when at least one heat pipe, in particular all heat pipes, of the first heat pipe assembly is/are at least substantially thermally decoupled from at least one heat pipe, in particular all heat pipes, of the second heat pipe assembly. By thermally decoupling at least one heat pipe, in particular all heat pipes, of the first heat pipe assembly from at least one heat pipe, in particular all heat pipes, of the second heat pipe assembly, a heat exchange between respective heat pipes of the first heat pipe assembly and corresponding heat pipes of the second heat pipe assembly is prevented, thereby increasing the efficiency in terms of heating or cooling the energy stores or the energy storage assembly via the respective heat pipe assemblies. The thermal decoupling can, e.g., be realized via thermally insulating thermal insulation elements, like e.g. formed bodies or coatings of thermally insulating materials, which are arranged or formed between the respective heat pipes of the first and second heat pipe assemblies.

Based on an exemplary embodiment, according to which respective evaporation zones of the heat pipes of the first heat pipe assembly, in which evaporation zones a liquid working medium can be evaporated, and corresponding condensation zones of the heat pipes of the second heat pipe assembly, in which condensation zones a gaseous working medium can be condensed, are thermally coupled with corresponding spacer elements, the provision of a thermal decoupling in particular between the evaporation zones of corresponding heat pipes of the first heat pipe assembly and the condensation zones of corresponding heat pipes of the second heat pipe assembly is appropriate.

Heat (condensation heat) dissipated via respective condensation zones of the heat pipes of the second heat pipe assembly thus does not or only insignificantly affect the evaporation in respective evaporation zones of the heat pipes of the first heat pipe assembly and thus a cooling action of the energy stores. Conversely, heat (evaporation heat) supplied via respective evaporation zones of the heat pipes of the first heat pipe assembly thus does not or only insignificantly affect the condensation in respective condensation zones of the heat pipes of the second heat pipe assembly and thus a heating action of the energy stores.

In particular in connection with the afore-mentioned exemplary embodiment of the energy storage assembly, in which at least one heat pipe of the first heat pipe assembly, having an evaporation zone, in which a liquid working medium can be evaporated within the heat pipe, is thermally coupled to at least one spacer element, it is appropriate to thermally couple at least one heat pipe of the first heat pipe assembly with an associated condensation zone, in which a gaseous working medium can be condensed, with at least one heat sink, in particular in the form of a cooling device designed as a heat exchanger or including at least one heat exchanger. This improves efficiency of the heat exchange via the heat pipes of the first heat pipe assembly with the spacer element(s).

Correspondingly, it is suitable, especially in connection with the afore-described embodiment of the energy storage assembly, in which at least one heat pipe of the second heat pipe assembly having a condensation zone, in which a gaseous working medium within the heat pipe can be condensed, is thermally coupled with at least one spacer element, when at least one heat pipe of the second heat pipe assembly with associated evaporation zone, in which a contained liquid working medium can be evaporated, is thermally coupled with at least one heat source, which belongs to or is associated with in particular the energy storage assembly. This improves efficiency of the heat exchange via the heat pipes of the second heat pipe assembly with the spacer element(s). A respective heat source can involve, e.g., at least one functional component, like e.g. a charger or a control device, e.g. in the form of a control electronics, which belongs to or is associated to the energy storage assembly.

In order to maintain also at least one corresponding functional component of the energy storage assembly, like e.g. a charger or a control device, e.g. in the form of a control electronics, at a moderate temperature, i.e. to heat or to cool, provision is made in accordance with a further embodiment of the energy storage assembly for a third heat pipe assembly which includes at least one heat pipe and is thermally coupled with the or at least one of the functional components serving as heat source and belonging to or associated with the energy storage assembly.

It is hereby appropriate, when at least one heat pipe of the third heat pipe assembly with an evaporation zone, in which a liquid working fluid within the heat pipe can be evaporated, is thermally coupled to the at least one functional component serving as heat source and belonging to or associated with the energy storage assembly. Thus, respective functional components can be cooled via such an arrangement of respective heat pipes of a third heat pipe assembly. In this context, it is appropriate in terms of respective heat pipes of the second heat pipe assembly, when the heat pipes with respective evaporation zones, in which a contained liquid working medium can be evaporated, are thermally coupled with the functional component, so that the latter can be heated via the heat pipes of the second heat pipe assembly and cooled via the heat pipes of the third heat pipe assembly.

At least one heat pipe of the third heat pipe assembly with an associated condensation zone, in which a gaseous working medium within the heat pipe can be condensed, can be thermally coupled with the or at least one heat sink, in particular in the form of a cooling device configured as heat exchanger or at least including a heat exchanger. This improves efficiency of the heat exchange via the heat pipes of the third heat pipe assembly with the functional component(s) of the energy storage assembly.

In a further embodiment of the energy storage assembly, at least the first heat pipe assembly and the second heat pipe assembly constitute each components of a temperature control device for maintaining at least one electrical energy store or a respective energy storage assembly at a moderate temperature. When present, a third heat pipe assembly, also suitably constitutes a component of the temperature control device.

The invention further relates to a temperature control device for maintaining at least one electrical energy store of an energy storage assembly having a plurality of electrical energy stores, particularly energy storage assembly as described above, at a moderate temperature, with at least one thermally conductive spacer element being arranged or formed between at least two electrical energy stores to at least partly separate the two electrical energy stores from each other. The temperature control device is characterized in that it includes two heat pipe assemblies, each including at least one heat pipe, wherein the at least one spacer element or at least one spacer element is thermally coupled with at least one heat pipe of the first heat pipe assembly and at least one heat pipe of the second heat pipe assembly. Thus, all statements in connection with the energy storage assembly, i.e. in particular also in connection with the described embodiments of the energy storage assembly, apply analogously to the temperature control device.

The invention further relates to a motor vehicle. The motor vehicle includes at least an energy storage device as described or at least one temperature control device as described. Accordingly, all statements in connection with the energy storage assembly, i.e. in particular also in connection with the described embodiments of the energy storage assembly, and in connection with the temperature control device apply analogously to the motor vehicle.

BRIEF DESCRIPTION OF THE DRAWING

Further advantages, features and details of the invention will become apparent from the exemplary embodiments described hereinafter and from the drawings, in which.

DETAILED DESCRIPTION OF PREFERRED EMBODIMENTS

Figure 1:
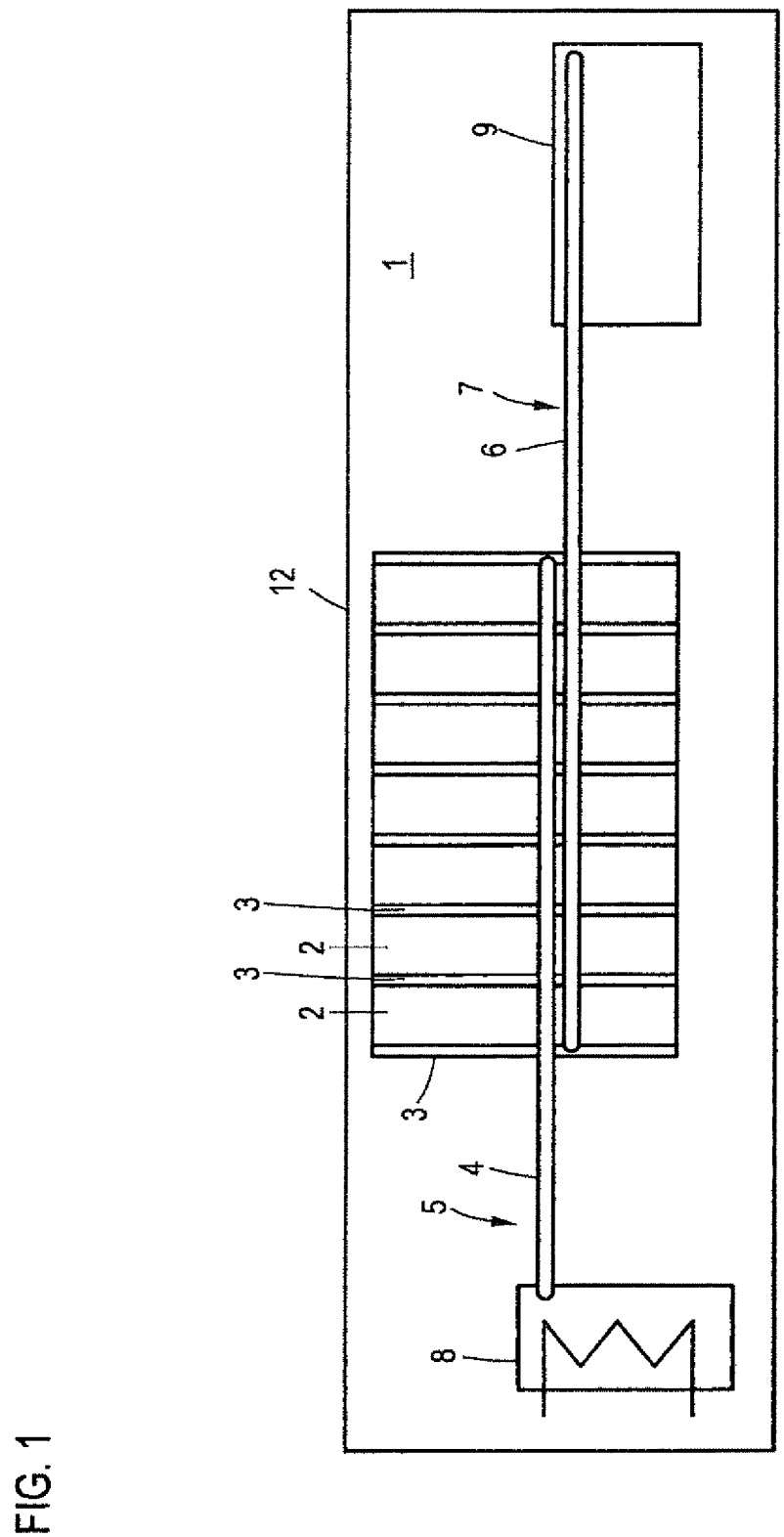
FIGS. 1, 2 show each a basic illustration of an energy storage assembly according to an exemplary embodiment of the invention.

FIG. 1 shows a basic illustration of an energy storage assembly 1 according to one exemplary embodiment of the invention. The energy storage assembly 1 is part of a motor vehicle 12, in particular of a hybrid or electric vehicle, and is provided to supply electric power to electric consumers, like e.g. an electrical drive unit (not shown), on the motor vehicle side.

The energy storage assembly 1 includes a plurality of electrical energy stores. 2 The electrical energy stores 2 are electrically connected via an electric connection element (not shown), in particular in the form of a conductive rail or conductor rail ("bus bar"), i.e. connected in series or in parallel. The electric connection element contacts hereby corresponding electrical connectors (not shown) arranged on respective exposed outer wall sections of corresponding energy storage housings (not shown) of the energy stores 2.

Readily apparent in the Figs. are the exemplary embodiment of respectively cuboid or prismatic energy stores 2 in parallel alignment arranged adjacent to one another to thereby form an energy store stack ("stack"). The energy store stack is held in a holding device (not shown). Potential forces, particularly compressive forces, can be applied upon the energy store stack via the holding device.

Plate-shaped spacer elements 3 are respectively arranged between the energy stores 2 to separate them. A respective spacer element 3 thus keeps otherwise directly adjacent energy stores 2 apart from each other by a measure determined by its dimensions, i.e. in particular its wall thickness.

The spacer elements 3 thus have electrically insulating, and at the same time thermally conductive properties. The spacer elements 3 can therefore be made e.g. of a plastic or ceramic material formed with thermally conductive particles, like e.g. graphite particles. It is also conceivable to form the spacer elements 3 from metal like e.g. aluminum, which is surrounded by an electrically insulating material, like e.g. a plastic or ceramic material, e.g. in the form of a coating.

The spacer elements 3 thus provide, on one hand, spacing between immediately adjacent energy stores 2 so that immediately adjacent energy stores 2 do not contact each other electrically or mechanically. On the other hand, the spacer elements 3 act as a result of their thermally conductive properties as heat conductors for the purpose of cooling the energy stores 2 or the energy storage assembly 1 by dissipating heat, particularly from the contacting energy stores 2, or, for the purpose of heating the energy stores 2 or energy storage assembly 1 by supplying heat, particularly to the contacting energy stores 2.

Readily apparent is the energy store stack in the area of a viewer-facing side surface of a heat pipe 4 of a first heat pipe assembly 5 and of a heat pipe 6 of a second heat pipe assembly 7. The heat pipes 4, 6 thus extend along this side surface of the energy store stack. It is, of course, possible that respective or further heat pipes 4 of the first heat pipe assembly 5 and respective or further heat pipes 6 of the second heat pipe assembly 7 extend at other or further side surfaces of the energy store stack. It is equally conceivable that respective or further heat pipes 4 of the first heat pipe assembly 5 and respective or further heat pipes 6 of the second heat pipe assembly 7 extend at least in part through the energy store stack, and thus are arranged within the energy store stack.

The respective heat pipes 4 of the first heat pipe assembly 5 as well as the respective heat pipes 6 of the second heat pipe assembly 7 are thermally coupled to the spacer elements 3, respectively The spacer elements 3 thus form a thermal bridge between the heat pipes 4 of the first heat pipe assembly 5 and the heat pipes 6 of the second heat pipe assembly 7, on one hand, and the energy stores 2, on the other hand.

The respective heat pipes 4 of the first heat pipe assembly 5 are arranged and aligned such as to be thermally coupled with respective evaporation zones, in which a contained liquid working medium, like, e.g., water and/or an organic fluid such as e.g. glycol can be evaporated, to the spacer elements 3. Heat (evaporation heat) required for the evaporation of the working medium is thus removed from the spacer elements 3 or via the spacer elements 3 from the energy stores 2. The energy stores 2, including the energy storage assembly 1, can thus be cooled via the heat pipes 4 of the first heat pipe assembly 5.

The respective condensation zones of the heat pipes 4 of the first heat pipe assembly 5, in which condensation zones a contained gaseous working medium can be condensed, are thermally coupled with a heat sink 8 in the form of a motor-vehicle-side heat exchanger. Heat (condensation heat) generated during condensation of the working medium can thus be transferred to the heat sink 8. The heat exchanger can be part of the energy storage assembly 1, i.e. belong to or associated with the energy storage assembly 1.

The respective heat pipes 6 of the second heat pipe assembly 7 are arranged and aligned such as to be thermally coupled with their respective condensation zones, in which a contained gaseous working medium, can be condensed, to the spacer elements 3. Heat (condensation heat) can thus be transferred during condensation of the working medium to the spacer elements 3 or via the spacer elements 3 to the energy stores 2. Thus, the energy stores 2 and the energy storage assembly 1, can be heated via the heat pipes 6 of the second heat pipe assembly 7.

The respective evaporation zones of the heat pipes 6 of the second heat pipe assembly 7, in which evaporation zones a contained liquid working medium can be evaporated, are thermally coupled with a heat source 9 in the form of a functional component, i.e., e.g., a charger or a control device or a control electronics, associated to the energy storage assembly 1. Heat (evaporation heat) required for the evaporation of the working medium can be thus be removed from the heat source 9. Thus, the functional component can be cooled via the heat pipes 6 of the second heat pipe assembly 7.

The respective heat pipes 4, 6 of the first and second heat pipe assemblies 5, 7 are thermally decoupled from one another. A heat exchange between the heat pipes 4, 6 of the first and second heat pipe assemblies 5, 7 is therefore not possible or at least largely inhibited, so that the efficiency of the described heating or cooling operations of the energy stores 2 and the energy storage assembly 1 is not adversely affected. The thermal decoupling is realized via thermal insulation means (not shown) arranged between the heat pipes 4, 6 of the first and second heat pipe assemblies 5, 7.

The two heat pipe assemblies 5, 7, and their associated heat pipes 4, 6 enables implementation of a temperature control device for controlling the temperature, i.e. for heating or cooling, of the energy stores 2 of the energy storage assembly 1.

The energy storage assembly 1 or the temperature control device may further include a third heat pipe assembly 11 having at least one heat pipe 10. This variant is shown in the exemplary embodiment of FIG. 2.

Figure 2:
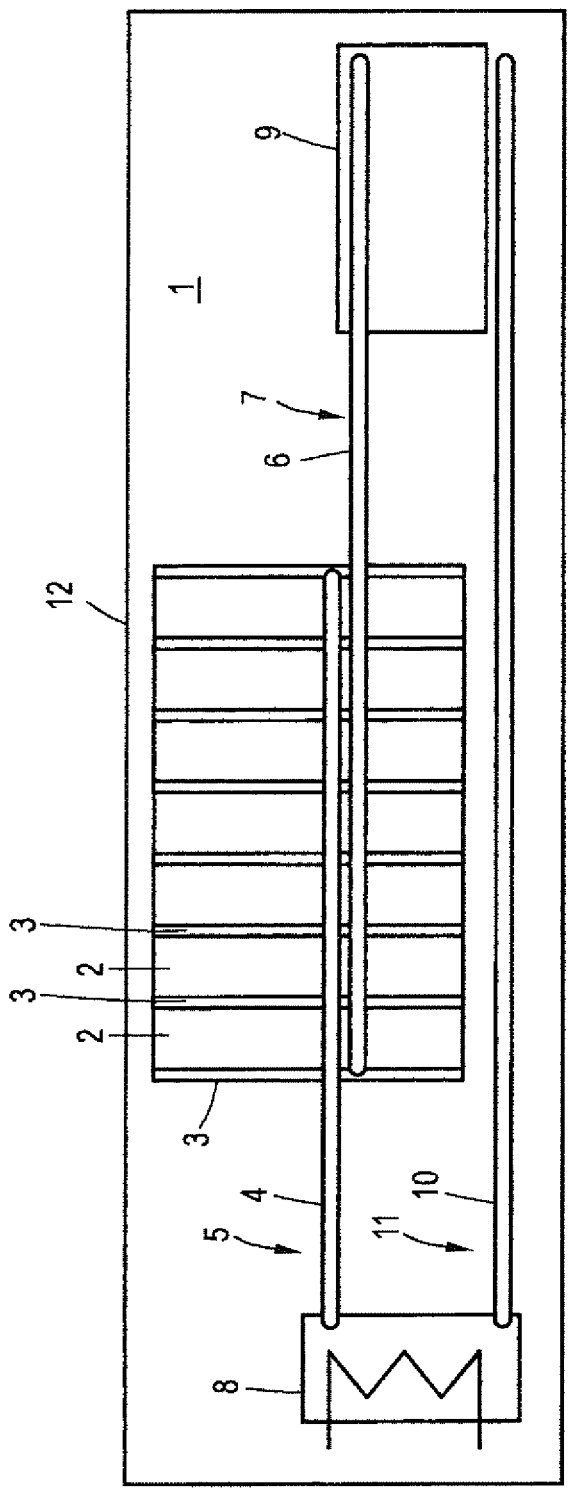

In the exemplary embodiment shown in FIG. 2, a heat pipe 10 associated to the third heat pipe assembly 11 is arranged between the functional component, serving as heat source 9, of the energy storage assembly 1 and the heat sink 8 or thermally coupled with the functional component, serving as heat source 9, of the energy storage assembly 1 and the heat sink 8.

The heat pipe 10 of the third heat pipe assembly 11 is arranged and aligned such as to thermally couple an evaporation zone, in which a contained liquid working medium can be evaporated, with the heat source 9. Heat (evaporation heat) required for evaporating the working medium is thus removed from the heat source 9. The heat source 9 can thus also be cooled via the heat pipe 10 of the third heat pipe assembly 11

The condensation zone of the heat pipe 10 of the third heat pipe assembly 11, in which condensation zone a contained gaseous working medium can be condensed, is thermally coupled with the heat source 8. Heat (condensation heat) generated during condensation of the working medium can thus also be transferred to the heat sink 8.

As described above, the respective heat pipe(s) 10 of the third heat pipe assembly 11 may also form parts of the or a corresponding temperature control device, as described in connection with the exemplary embodiment shown in FIG. 1.

Overall, a relatively simple and efficient principle for controlling the temperature of an energy storage assembly 1, the associated energy stores 2, and various functional components associated to the energy storage assembly 1, is thus provided. This is in particular the result of a targeted arrangement and alignment of the heat pipes 4, 6, 10 and their associated condensation and evaporation zones of the respective heat pipe assemblies 5, 7, 11.

What is claimed is:

1. A temperature control device for controlling at least one electrical energy store of a plurality of electrical energy stores of an energy storage assembly, with a thermally conductive spacer element being arranged between at least two electrical energy stores and having at least one area to separate the at least two electrical energy stores, said temperature control device comprising:
   a first heat pipe assembly including at least one heat pipe;
   a second heat pipe assembly including at least one heat pipe;
   a heat sink, said at least one heat pipe of the first heat pipe assembly having a condensation zone, in which a contained gaseous working medium can be condensed, said condensation zone being thermally coupled to the heat sink;
   a heat source, said at least one heat pipe of the second heat pipe assembly having an evaporation zone, in which a contained liquid working medium can be evaporated, said evaporation zone being thermally coupled to the heat source,
   wherein the at least one heat pipe of the first heat pipe assembly is thermally coupled with the heat sink and not any heat source, and the at least one heat pipe of the second heat pipe assembly is thermally coupled with the heat source and not any heat sink,
   wherein the at least one heat pipe of the first heat pipe assembly and the at least one heat pipe of the second heat pipe assembly are thermally coupled to the spacer element, and
   wherein the at least one heat pipe of the first heat pipe assembly is, at least substantially, thermally decoupled from the at least one heat pipe of the second heat pipe assembly when the first heat pipe assembly and the second heat pipe assembly are not directly physically in contact.

2. The temperature control device of claim 1, wherein the at least one heat pipe of the second heat pipe assembly has a thermally coupled condensation zone, in which a contained gaseous working medium can be condensed.

3. The temperature control device of claim 1, wherein the at least one heat pipe of the first heat pipe assembly has an evaporation zone, in which a contained liquid working medium can be evaporated, and the at least one heat pipe of the second heat pipe assembly has a condensation zone, in which a contained gaseous working medium can be condensed, said evaporation zone of the at least one heat pipe of the first heat pipe assembly being thermally decoupled from the condensation zone of the at least one heat pipe of the second heat pipe assembly.

4. The temperature control device of claim 1, further comprising a third heat pipe assembly including at least one heat pipe, and a heat source, said third heat pipe assembly being thermally coupled with the heat source.

5. The temperature control device of claim 4, wherein the at least one heat pipe of the third heat pipe assembly has an evaporation zone, in which a contained liquid working medium can be evaporated, said evaporation zone being thermally coupled to the heat source.

6. The temperature control device of claim 4, wherein the at least one heat pipe of the third heat pipe assembly has a condensation zone, in which a contained gaseous working medium can be condensed, said condensation zone being thermally coupled to the heat sink.

7. The temperature control device of claim 1, wherein at least one of the at least one heat pipe of the first heat pipe assembly and the at least one heat pipe of the second heat pipe assembly is directly thermally coupled to the spacer element.

8. The temperature control device of claim 1, wherein at least one member selected from the group consisting of the at least one heat pipe of the first heat pipe assembly and the at least one heat pipe the second heat pipe assembly is indirectly thermally coupled with the spacer element, and further comprising a thermally conductive thermal coupling element interposed between the member and the spacer element.

9. An energy storage assembly, comprising:
   a plurality of electrical energy stores;
   a first heat pipe assembly including at least one heat pipe;
   a second heat pipe assembly including at least one heat pipe, with the at least one heat pipe of the first heat pipe assembly being, at least substantially, thermally decoupled from the at least one heat pipe of the second heat pipe assembly when the first heat pipe assembly and the second heat pipe assembly are not directly physically in contact;
   a heat sink, said at least one heat pipe of the first heat pipe assembly having a condensation zone, in which a contained gaseous working medium can be condensed, said condensation zone being thermally coupled to the heat sink;
   a heat source, said at least one heat pipe of the second heat pipe assembly having an evaporation zone, in which a contained liquid working medium can be evaporated, said evaporation zone being thermally coupled to the heat source;
   a thermally conductive spacer element arranged between two of the electrical energy stores to separate them at least in one area thereof,
   wherein the spacer element is thermally coupled to the at least one heat pipe of the first heat pipe assembly and to the at least one heat pipe of the second heat pipe assembly, and
   wherein the at least one heat pipe of the first heat pipe assembly is thermally coupled with the heat sink and not any heat source, and the at least one heat pipe of the second heat pipe assembly is thermally coupled with the heat source and not any heat sink.

10. The energy storage assembly of claim 9, wherein the at least one heat pipe of the first heat pipe assembly is thermally coupled with an evaporation zone, in which a contained liquid working medium can be evaporated.

11. The energy storage assembly of claim 9, wherein the at least one heat pipe of the second heat pipe assembly is thermally coupled with a condensation zone, in which a contained gaseous working medium can be condensed.

12. The energy storage assembly of claim 9, wherein the at least one heat pipe of the first heat pipe assembly has an evaporation zone, in which a contained liquid working medium can be evaporated, and the at least one heat pipe of the second heat pipe assembly has a condensation zone, in which a contained gaseous working medium can be condensed, said evaporation zone of the at least one heat pipe of the first heat pipe assembly being thermally decoupled from the condensation zone of the at least one heat pipe of the second heat pipe assembly.

13. The energy storage assembly of claim 9, wherein the heat sink is a cooling device in the form of heat exchanger or at least one cooling device including a heat exchanger.

14. The energy storage assembly of claim 9, further comprising a third heat pipe assembly including at least one heat pipe, said third heat pipe assembly being thermally coupled with the heat source.

15. The energy storage assembly of claim 14, wherein the at least one heat pipe of the third heat pipe assembly has an evaporation zone, in which a contained liquid working medium can be evaporated, said evaporation zone being thermally coupled to the heat source.

16. The energy storage assembly of claim 14, wherein the at least one heat pipe of the third heat pipe assembly has a condensation zone, in which a contained gaseous working medium can be condensed, said condensation zone being thermally coupled to the heat sink.

17. The energy storage assembly of claim 16, wherein the heat sink is a cooling device in the form of heat exchanger or at least one cooling device including a heat exchanger.

18. The energy storage assembly of claim 9, wherein the first and second heat pipe assemblies form components of a tempering device for maintaining at least one of the electrical energy stores at moderate temperature.

19. The energy storage assembly of claim 9, wherein at least one of the at least one heat pipe of the first heat pipe assembly and the at least one heat pipe of the second heat pipe assembly is directly thermally coupled to the spacer element.

20. The energy storage assembly of claim 9, wherein at least one member selected from the group consisting o the at least one heat pipe of the first heat pipe assembly and the at least one heat pipe the second heat pipe assembly is indirectly thermally coupled with the spacer element, and further comprising a thermally conductive thermal coupling element interposed between the member and the spacer element.

21. A motor vehicle, comprising:
at least one energy storage assembly which includes a plurality of electrical energy stores, a first heat pipe assembly including at least one heat pipe, a second heat pipe assembly including at least one heat pipe, a heat sink, and a heat source, wherein the at least one heat pipe of the first heat pipe assembly has a condensation zone, in which a contained gaseous working medium can be condensed, said condensation zone being thermally coupled to the heat sink, wherein the at least one heat pipe of the second heat pipe assembly has an evaporation zone, in which a contained liquid working medium can be evaporated, said evaporation zone being thermally coupled to the heat source, with the at least one heat pipe of the first heat pipe assembly being, at least substantially, thermally decoupled from the at least one heat pipe of the second heat pipe assembly when the first heat pipe assembly and the second heat pipe assembly are not directly physically in contact, and a thermally conductive spacer element arranged between two of the electrical energy stores to separate them at least in one area thereof, wherein the spacer element is thermally coupled to the at least one heat pipe of the first heat pipe assembly and to the at least one heat pipe of the second heat pipe assembly, wherein the at least one heat pipe of the first heat pipe assembly is thermally coupled with the heat sink and not any heat source, and the at least one heat pipe of the second heat pipe assembly is thermally coupled with the heat source and not any heat sink; or at least one temperature control device for controlling at least one electrical energy store of a plurality of electrical energy stores of an energy storage assembly, with a thermally conductive spacer element being arranged between at least two electrical energy stores and having at least one area to separate the at least two electrical energy stores, said temperature control device comprising a first heat pipe assembly including at least one heat pipe, a second heat pipe assembly including at least one heat pipe, a heat sink, and a heat source,
wherein the at least one heat pipe of the first heat pipe assembly has a condensation zone, in which a contained gaseous working medium can be condensed, said condensation zone being thermally coupled to the heat sink,
wherein the at least one heat pipe of the second heat pipe assembly has an evaporation zone, in which a contained liquid working medium can be evaporated, said evaporation zone being thermally coupled to the heat source,
wherein the at least one heat pipe of the first heat pipe assembly and the at least one heat pipe of the second heat pipe assembly are thermally coupled to the spacer element, and wherein the at least one heat pipe of the first heat pipe assembly is, at least substantially, thermally decoupled from the at least one heat pipe of the second heat pipe assembly when the first heat pipe assembly and the second heat pipe assembly are not directly physically in contact, and
wherein the at least one heat pipe of the first heat pipe assembly is thermally coupled with the heat sink and not any heat source, and the at least one heat pipe of the second heat pipe assembly is thermally coupled with the heat source and not any heat sink.

* * * * *